US009045041B2

(12) United States Patent
Dorum et al.

(10) Patent No.: US 9,045,041 B2
(45) Date of Patent: Jun. 2, 2015

(54) DRIVER BEHAVIOR FROM PROBE DATA FOR AUGMENTING A DATA MODEL

(71) Applicant: Navteq B.V., Veldhoven (NL)

(72) Inventors: Ole Henry Dorum, Chicago, IL (US); Jane MacFarlane, Oakland, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 13/908,595

(22) Filed: Jun. 3, 2013

(65) Prior Publication Data

US 2014/0244125 A1    Aug. 28, 2014

Related U.S. Application Data

(60) Provisional application No. 61/770,139, filed on Feb. 27, 2013.

(51) Int. Cl.
*B60K 31/00* (2006.01)
*G01C 21/32* (2006.01)
(Continued)

(52) U.S. Cl.
CPC . *B60K 31/00* (2013.01); *G06F 7/00* (2013.01); *G08G 1/0112* (2013.01); *G01C 21/3484* (2013.01); *B60K 31/0066* (2013.01); *G01C 21/3492* (2013.01); *G01C 21/32* (2013.01)

(58) Field of Classification Search
CPC ............ G01C 21/26; B60Q 1/00; G01S 5/00; G06F 19/00; G06F 17/30
USPC ............ 701/1, 23–36, 48, 51, 53, 58, 70, 77, 701/78, 93–96, 116–119, 123, 29.3, 701/32.1–32.5, 32.9, 33.2, 33.4, 33.9, 701/34.2–34.4, 400, 409, 412–418, 450, 701/451; 700/69, 90, 91, 103, 186–189, 700/195, 250; 705/14.53, 14.58; 707/705, 707/748; 340/988, 989, 991–993, 995.13
See application file for complete search history.

(56) References Cited

U.S. PATENT DOCUMENTS 6,192,312 B1 *   2/2001  Hummelsheim ............. 701/118
7,479,897 B2 *   1/2009  Gertsch et al. ................ 340/936
(Continued)

FOREIGN PATENT DOCUMENTS

WO   WO2004110809   12/2004
WO   WO2010147730   12/2010

OTHER PUBLICATIONS

Dalia Said et al., Methodology for Driver Behaviour Data Collection and Analysis for Integration in Geometric Design of Highways, Nov. 2009, www.4ishgd.valencia.upv.es/index_archivos/79.pdf.
(Continued)

*Primary Examiner* — Thomas Tarcza
*Assistant Examiner* — Tyler J Lee
(74) *Attorney, Agent, or Firm* — Lempia Summerfield Katz LLC

(57) ABSTRACT

In one implementation, sets of probe data are collected by probe vehicles. The probe data describes the driving characteristics of the probe vehicles. The sets of probe data are sent to a server or a mobile device for analysis. A polycurve, including a piecewise function of map data, is modified based on the probe data. The polycurve may be a spline curve for an advanced driver assistance system. The modified polycurve may be used in the advanced driver assistance system for a vehicle traveling along the same path previously traversed by the probe vehicles. Based on the polycurve modified by the probe data, a driver assistance feature is provided to the vehicle.

26 Claims, 9 Drawing Sheets

(51) Int. Cl.
    *G06F 7/00*     (2006.01)
    *G08G 1/01*     (2006.01)
    *G01C 21/34*    (2006.01)

(56) References Cited

U.S. PATENT DOCUMENTS

| | | | | |
|---|---|---|---|---|
| 7,680,749 | B1* | 3/2010 | Golding et al. | 706/14 |
| 7,689,354 | B2* | 3/2010 | Heiniger et al. | 701/412 |
| 8,260,532 | B2* | 9/2012 | Roesser | 701/117 |
| 8,478,499 | B2* | 7/2013 | Rupp et al. | 701/93 |
| 8,583,366 | B2* | 11/2013 | Iida | 701/450 |
| 8,698,649 | B2* | 4/2014 | Denaro | 340/905 |
| 2007/0008090 | A1* | 1/2007 | Gertsch et al. | 340/435 |
| 2007/0150185 | A1* | 6/2007 | Nagase et al. | 701/209 |
| 2008/0262721 | A1* | 10/2008 | Guo et al. | 701/208 |
| 2009/0005958 | A1* | 1/2009 | Roesser | 701/117 |
| 2010/0082248 | A1 | 4/2010 | Dorum et al. | |
| 2010/0082307 | A1 | 4/2010 | Dorum et al. | |
| 2012/0078867 | A1 | 3/2012 | Dorum | |
| 2012/0095682 | A1 | 4/2012 | Wilson | |
| 2012/0259547 | A1* | 10/2012 | Morlock et al. | 701/533 |
| 2012/0277993 | A1* | 11/2012 | Mund | 701/450 |
| 2013/0079964 | A1* | 3/2013 | Sukkarie et al. | 701/22 |
| 2013/0090823 | A1* | 4/2013 | Hoffmann | 701/70 |
| 2013/0158871 | A1* | 6/2013 | Joh | 701/532 |

OTHER PUBLICATIONS

Eric Fitzsimmons, Development and Analysis of Vehicle Trajectories and Speed Profiled Along Horizontal Curves, 2011, udini.proquest.com/view/development-and-analysis-of-vehicle-pqid:2392655291/.
International Search Report and Written Opinion cited in PCT/EP2014/053663, mailed Jun. 10, 2014.

* cited by examiner

DRIVER BEHAVIOR FROM PROBE DATA FOR AUGMENTING A DATA MODEL

RELATED APPLICATIONS

The present patent application claims the benefit of the filing date under 35 U.S.C. §119(e) of U.S. Provisional Patent Application Ser. No. 61/770,139, filed Feb. 27, 2013, which is hereby incorporated by reference herein in its entirety.

TECHNICAL FIELD

The following disclosure relates to probe data of driving behavior to augment a data model, or more particularly, safety applications using probe data of driving behavior.

BACKGROUND

An advanced driver assistance system (ADAS) helps a driver in the driving process. ADAS technology was developed to improve the comfort, efficiency, safety, and overall satisfaction of driving. ADAS features may use a variety of sensor mechanisms in the vehicle to determine the current state of the vehicle and the current state of the roadway in front of the vehicle. The ADAS features provide feedback to the driver.

ADAS features may also use digital map data. The digital map data can provide useful information that cannot reliably be provided by sensors, such as curvature, grade, bank, speed limits that are not indicated by signage, lane restrictions, and so on. Further, digital map data may provide a predictive capability well beyond the range of sensors or even beyond the vision of the driver to determine the road ahead of the vehicle, around corners, over hills, or beyond obstructions.

The digital map data may provide information about the road network, road geometry, road conditions, and other items associated with the road and terrain around the vehicle. As improvements are made in the accuracy of the digital map data and the geographic coverage of the digital map data, ADAS features have become more accurate. However, challenges remain in improving the accuracy of ADAS features that cannot be met relying on digital map data alone.

SUMMARY

In an embodiment, sets of probe data are collected by probe vehicles. The probe data describes the driving characteristics of the probe vehicles. The sets of probe data are sent to a server or a mobile device for analysis. A polycurve, including a piecewise function of map data, is modified based on the probe data. The polycurve may be a spline curve for an advanced driver assistance system. The modified polycurve may be used in the advanced driver assistance system for a vehicle traveling along the same path previously traversed by the probe vehicles. Based on the polycurve modified by the probe data, a driver assistance feature may be provided to the vehicle.

BRIEF DESCRIPTION OF THE DRAWINGS

Exemplary embodiments of the present invention are described herein with reference to the following drawings.

DETAILED DESCRIPTION

The following embodiments incorporate previously recorded probe data into an advanced driver assistance system (ADAS) to create an enhanced model for determining driver behavior from the probe data. The resulting enhanced model may be used for safety applications such as autonomous vehicle control. The new data model supplements an analytical (spline) curvature model with speed profile and/or lateral acceleration data derived from probe driver behavior. The new data model extends to cover various environmental conditions.

ADAS provides driving assistance features to a user. The driving assistance features may include lane departure warnings, lane change assistance, collision avoidance, intelligent speed adaption, adaptive light control, or other features. Some driving assistance features may be navigational features that rely on map data.

The driver assistance features may utilize the position of the road, the curvature of the road, the banking angle of the road, the coefficient of friction of the road service, the grade of the road, and other physical and/or geometric attributes. The driver assistance features may be further augmented using probe data that describes the actual driving behavior of drivers. The probe data may include information describe how people accelerate, decelerate, brake, or perform other actions while navigation a road segment or a particular curve on the road.

The driving assistance features may include autonomous vehicle control by determining driver behavior from probe data. The data model supplements a spline curvature model with speed profile and lateral acceleration data derived from probe driver behavior, and may also be customized to environmental conditions or the type of vehicle.

The data may be measured with sensors, such as a global positioning system (GPS) or another satellite based positioning. The sensors may include inertial sensors (e.g., accelerometer and/or gyroscopes). The sensors may include a magnetometer. A measured path curve is derived from the measured data and compared to the path curve from the database. The data may be received from a controller area network (CAN) bus, which is a message based protocol to allow microcontrollers to commute within a vehicle. The data may be received from an on-board diagnostic system (e.g., OBD-II). The on-board diagnostic system includes a set of sensors related to automotive systems (e.g., emissions, exhaust, fuel efficiency, unsafe driving, engine speeds, vehicle speeds, fuel level, and other parameters.)

Figure 1:
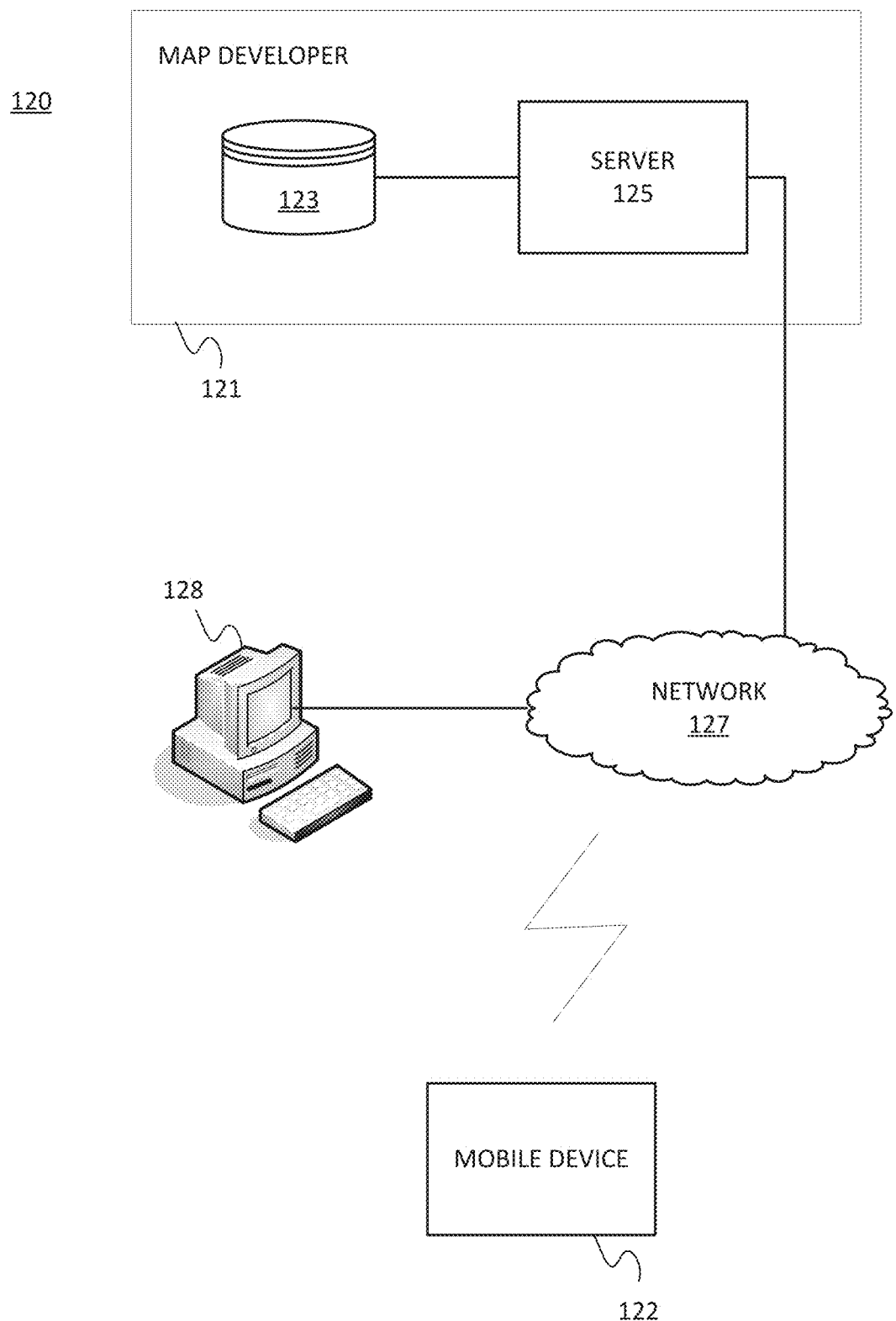
FIG. 1 illustrates an example system for augmenting a data model with probe data.

FIG. 1 illustrates an exemplary system 120. The system 120 includes a map developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. The mobile device 122 may also include a compiled ADAS navigation database, which may be stored on physical media such as a non-transitory computer readable medium. The developer system 121 may include computer systems and networks of a system operator (e.g., NAVTEQ or Nokia Corp.).

In one embodiment the mobile device 122 includes sensors for collecting the probe data. In another embodiment, the mobile device 122 includes the ADAS device for delivering driving assistance features. The mobile device 122 may operate in communication with the server 125 or the mobile device 122 may deliver assistance features without communication with the server 125 when the data has been previously uploaded into the mobile device 122.

Behavior based models are derived from analyzing probe data. These models provide the actual speed driven analytically, e.g. as a spline curve so that the speed at any point on the road can be determined in each direction of travel. The lateral acceleration at any point on the road in each direction may be computed. The curvature (k) of the path (e.g., lane, road, sidewalk, street, or highway) allows calculation of the lateral acceleration (a) from the speed or velocity (v): a=k*v*v. In other words, lateral acceleration is the curvature times the square of the speed. The curvature is computed from the ADAS spline or from a curve fit to probe data. Probe data is projected onto the ADAS spline to allow spatial ordering of the data to associate probes with corresponding spline/road location. Spatial sorting along this line determines average driving behavior at any point along the road along with standard deviations.

The existing ADAS model can be enhanced with the behavior based model as one or more additional dimensions of the ADAS spline curve. Alternately, the driver behavior can be stored in one or more separate spline curves. Enhancing the existing ADAS model with such behavior based data greatly improves the reliability of speed curve warning applications. The enhanced ADAS model also simplifies the algorithms for these types of applications. Driving assistance applications may issue instructions and/or warning to drivers to maintain a comfortable driving speed in curves based on behavior modeled from the probe data. Autonomous vehicle behavior and may be greatly improved using these algorithms.

One or more dimensions of the polycurve stores properties of the path. For example, a polycurve describing a 3D path curve (e.g. road center, lane center or average vehicle path per lane) has 3 dimensions (x, y, z). From these dimensions curvature may be computed through taking the derivative (e.g., the first derivative and/or the second derivative) of at least a portion of the polycurve. Equation 1 provides an example curvature (k) calculation using Cartesian coordinates (x, y, z), where x' and y' are the first derivatives of x and y, and x'' is the second derivative of x. Equation 2 provides an example parametric curvature calculation, where $p^u$ is the first derivative of p and $p^{uu}$ is the second derivative of p.

$$k = \frac{x'y'' - y'x''}{(x'^2 + y'^2)^{3/2}} \qquad \text{Eq. 1}$$

$$k = \frac{|p^u \times p^{uu}|}{|p^u|^3} \qquad \text{Eq. 2}$$

Alternately the curvature can be stored in a dimension separate from the other path properties. Heading and slope may be calculated or stored separately as well. Additionally, other driver behaviors may be stored in other dimensions of the polycurve such as speed, braking, lateral acceleration etc. Multiple polycurves can be used as well instead of adding dimensions to a single polycurve.

In one example, the types of probe vehicles, such as sedan versus truck, allows models to be targeted to specific class of vehicle. The data is sorted according to type of vehicle and a different spline curve is generated for each type of vehicle. When an ADAS is installed in a vehicle, the ADAS may be specific to the type of vehicle and provide driving assistance messages or warnings for the specific type of vehicle. The ADAS may include a spline curve specific to a specific type of vehicle or multiple spline curves corresponding to multiple types of vehicles.

In one example, the environmental condition during the collection of the probe data is recorded. The probe data is sorted according to traffic levels, weather condition, time of day, or other conditions. A different spline curve may be generated for each type of environment condition. When the driving assistance feature is provided to the user, the current environmental condition is detected and a spline curve is selected according to the specific environmental condition. Therefore, driving assistance messages may be delivered to a driver according to traffic, weather, time, or other conditions. This allows for customized experiences based on vehicle type and environment.

In one example, the probe data is sorted according to the direction of travel along the path. A different spline curve may be generated for each direction of travel. When the driving assistance feature is provided to the user, the spline for the appropriate direction of travel may be selected according to the direction of travel of the user. Therefore, driving assistance messages may be delivered to a driver according to direction of travel.

In one example, the server 125 receives at least one set of probe data from one or more vehicles. The server 125 may record the type of vehicle, the environmental conditions, or other attributes along with the probe data. The probe data may include position only (e.g., generated from a global positioning system (GPS)). Alternatively, the probe data may be more robust and comprise speed data from the speedometer of the vehicle, braking data from the electronic braking system of the vehicle, or any data available from the vehicle monitoring system (e.g., CAN bus or OBD).

The server 125 is configured to modify a spline curve based on the at least one set of probe data. The server 125 may add one or more dimensions to the spline curve based on the probe data. The server 125 may be a database server for modifying and/or enhancing the database 123 including the ADAS model.

The server 125 is configured to send the probe data to the mobile device 122 or otherwise directly provide a driver assistance feature based on the modified spline curve. The driving assistance feature may include safety warnings as the vehicle enters a curve. For example, the server 125 may compare the current speed or acceleration of the vehicle to a comfort driving threshold or a safety driving threshold for the curve. The comfort driving comfort threshold may be the mean or median for the speed of multiple probe vehicles at a given position for a given direction of travel, or some threshold above the mean, e.g. based on the standard deviation. The safety driving threshold may be some threshold larger than the comfort threshold above the mean for the speed of multiple probe vehicles at a given position, and can also be based on the standard deviation. In one example, the comfort threshold is a first number of standard deviations (e.g., 1 or 2)

greater than the mean and the safety threshold is a second number of standard deviations (e.g., 2 or 3) greater than the mean.

The given position for the analysis may be defined for each curve along the spline. In one example, each curve includes two positions for analysis. A first position is the position where, on average, drivers of probe vehicles begin to brake and/or decelerate for the upcoming curve. The second position is the position where, on average, drivers of the probe vehicles stop braking and/or decelerating for the curve.

The mobile device 122 may also perform calculations for the driving assistance feature. The mobile device 122 may receive data indicative of a position of a vehicle. The mobile device 122 may determine a speed of the vehicle or an acceleration of the vehicle. The speed may be the first derivative of the position data. The acceleration may be the second derivative of the position data.

The mobile device 122 is configured to compare the speed of the vehicle or the acceleration of the vehicle to a typical driver behavior dimension of a spline curve, which is derived from previously recorded probe data. The mobile device 122 is configured to generate a warning when the speed or the acceleration exceeds the driver behavior dimension.

In one implementation, the mobile device 122 and/or server 125 is configured to generate driving assistance messages to instruct the driver to slow down in order not to exceed a target lateral acceleration. The target lateral acceleration may be the average lateral acceleration of the probe vehicles. The driving assistance feature may target a constant lateral acceleration across the curve for each direction of travel. One example of a target lateral acceleration is 4 meters/second$^2$.

Figure 2A:
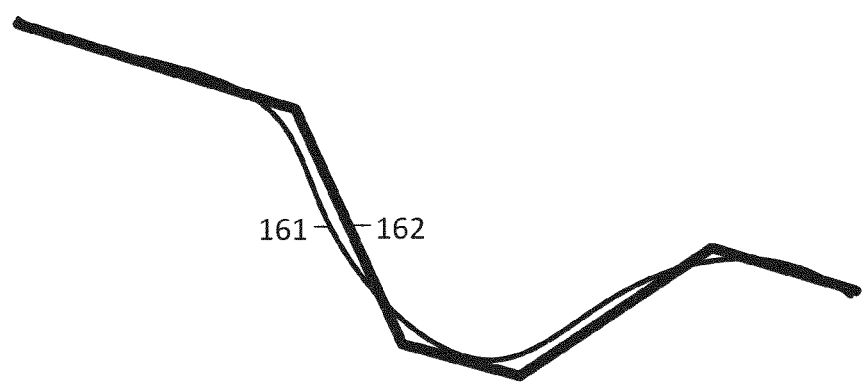
FIG. 2A illustrates an example spline curve.
Figure 2B:
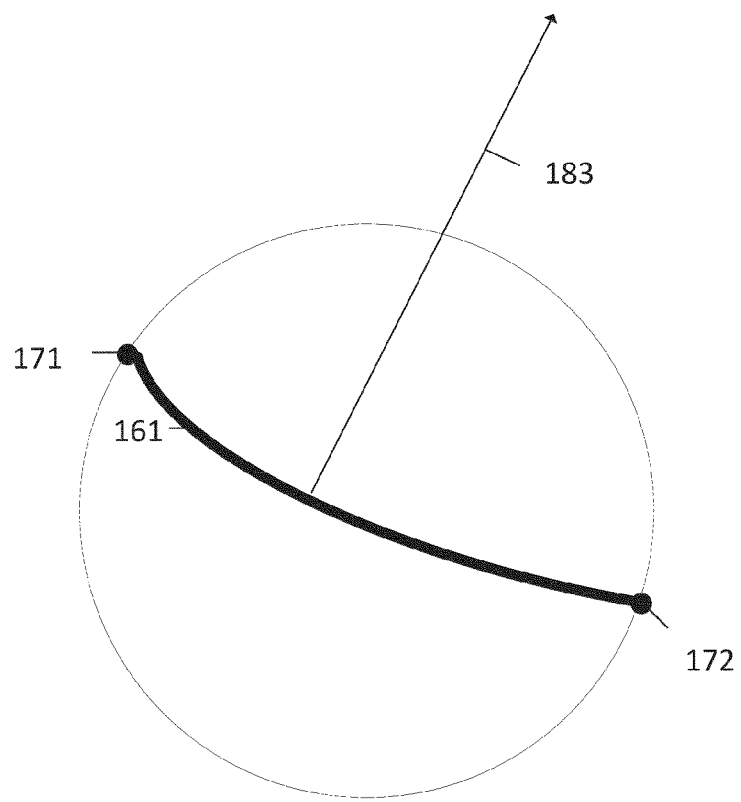
FIG. 2B illustrates an example curvature of the spline curve of FIG. 2A.

The database 123 may be a map database or a geographic database configured to store path curves as splines, bezier curves, clothoids, or piecewise polynomials, to represent navigable paths. The preceding examples may be referred to as polycurves. FIG. 2A illustrates an example polycurve 161 modeling road link segments 162. A polycurve is defined as a curve continuous over a length. The curvature of the polycurve is variable over the length of the polycurve. One section of the polycurve has a different curvature than another section of the polycurve. The polycurve may include a plurality of intervals each associated with a curvature value.

A bezier curve is a parametric curve. For example, the bezier curve may be defined according to one equation in one axis and another equation in another axis. The equations are functions of a single parametric variable. A B-spline is a generalization of a bezier curve. The B-spline is defined according to control points and knots.

A clothoid is a curve with linearly varying curvature. The curvature of the clothoid may be a function of the position along the clothoids. For example, the curvature of the clothoids may be proportional to a corresponding length of the clothoid. The curvature of the clothoid may begin with zero at a straight section and increase linearly with curve length. A piecewise polynomial is defined by multiple polynomial equations. Each of the polynomial equations defines a different section of the piecewise polynomial. The sections of the piecewise polynomial may be defined by endpoints (e.g., knot points) or a parametric variable.

In one example, a spline curve is a composite curve formed with piecewise polynomial functions representing the curve section. The points where the polynomial functions piece together are referred to as knots, and the points on the line segments that define the shape of the spline are control points. There are many types of spline curves. Spline curves with evenly spaced knot points are uniform spline curves, and spline curve with irregularly spaced knot points are non-uniform spline curves.

The path curve may be associated in the database 123 with a geographic location or multiple locations. The path curve may be associated with a starting point and an endpoint or series of points along the path curve. Alternatively, the path curve may be defined in the database 123 by listing the control points and/or knot points.

The mobile device 122 calculates position data for the mobile device 122 as the mobile device 122 travels along the path. The position data may be calculated by a satellite-based positioning system, an inertial measurement unit (IMU) or both. Either of which or both may be referred to as a positioning unit. The mobile device 122 transmits the position to the server 125. The server 125 is configured to access one of the stored spline curves according to the position data for the mobile device 122.

The path curves in a geographic database may be generated from two-dimensional link geometry. The link geometry includes line segments that connect a series of points. In one example, map data in the geographic database includes paths only in the form of straight line segments. The links are used to fit a path curve by estimating the link geometry may be polynomials, spline curves, b-spline curves, bezier curves, clothoids, or other parametric or non-parametric curve types. The path curve may be two-dimensional (e.g., latitude and longitude), three-dimensional (e.g., latitude, longitude, and height) or have another number of dimensions.

Polynomial interpolation or approximation techniques, such as a non-uniform rational B-spline (NURBS) interpolation or approximation may be used to generate the path curve from the road geometry. Calculus of Variations may also be used to impose shape constraints of the curve shape in between the constraints. While this process may be performed by a computer and include automated aspects, design considerations and/or manual intervention may affect the resulting path curve. Control point locations, weighting factors for control points, knot point location, and knot point intervals may vary between users and between interpolation software techniques. Further, geographic databases cover vast areas and combine data from multiple sources. For example, some road geometry may be collected through field vehicles, some road geometry may be collected through satellite or aerial images, and other road geometry may be derived from surveyed maps. Because of these variables, the accuracy of the path curves in a map database may vary from path to path or even along the same path.

The curvature may be a numerical value based on a radius of a theoretical circle having the same shape as the path curve in that particular section. The curvature may be an inverse of the radius of the theoretical circle. The curvature may be assigned a sign (positive or negative) depending on the direction of the path curve. Vector 183 represents the curvature of the previously stored path curve 161. The vector 183 may be perpendicular to the stored path curve 161. The vector 183 may be a unit normal vector scaled by the curvature. The vector 183 may be assigned a sign or polarity depending on which side of the path curve the vector 183 points.

The mobile device 122 is a smart phone, a mobile phone, a personal digital assistant ("PDA"), a tablet computer, a notebook computer, a personal navigation device ("PND"), a portable navigation device, in-car navigation system with an ADAS safety application, and/or any other known or later developed portable or mobile device. The mobile device 122 includes one or more detectors or sensors as a positioning system built or embedded into or within the interior of the mobile device or vehicle 122. The mobile device 122 receives location data from the positioning system.

The optional workstation 128 is a general purpose computer including programming specialized for the following embodiments. The workstation 128 may be configured to display the spline curves. The workstation 128 includes at least a memory, a processor, and a communication interface. In one embodiment, the workstation 128 is used for navigation where previously acquired measured curves from the mobile device 122 are used for comparison with curves from the developer system 121.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 3:
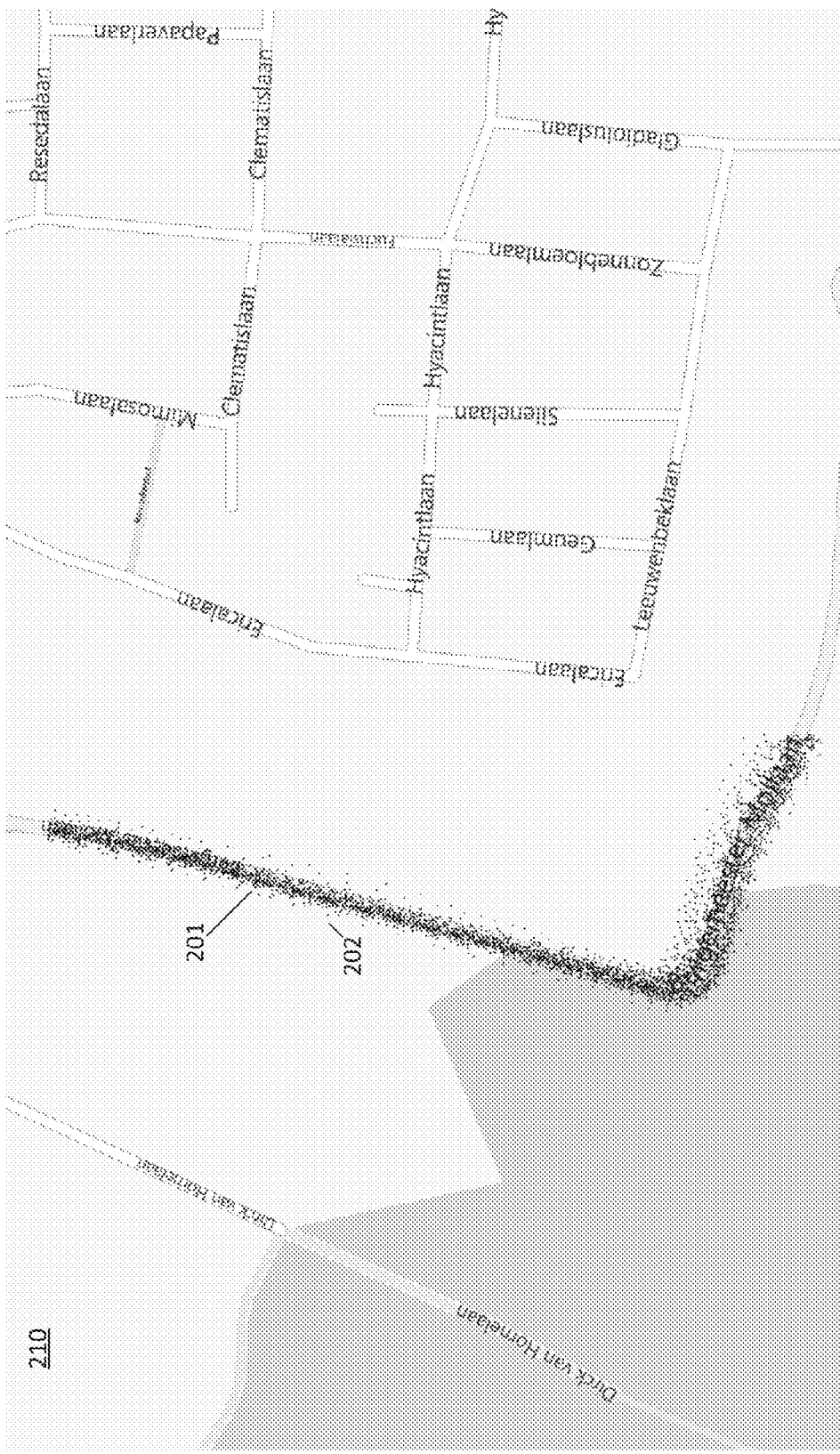
FIG. 3 illustrates an example set of probe data.

FIG. 3 illustrates an example set of probe data 202 collected by probe vehicles. The set of probe data 202 is illustrated on map 210 to show the positions of the points in the set of probe data 202. In one example, the set of probe data 202 includes discrete measurements of speed, acceleration, orientation, or other measurements. That is, for each position in the set of probe data 202, the speed is measured. In another example, the speed is calculated from a series of position coordinates as the change in position or the first derivative of position. Further, the acceleration may be measured directed by an accelerometer or derived from the position data as the second derivative of position.

The probe data may describe any combination of the speed, acceleration, or banking of the probe vehicles. The probe data may be collected every predetermined period (e.g., 1 second, 10 seconds, or another time value) or the probe data may be detected continuously. The probe data may be every predetermined distance or be collected proportional to the curvature of the road to provide denser sampling in curvy road sections than straighter sections. Outlier data points 201 in the probe data may be filtered according to position outside of range or statistically improbable position, speed, acceleration, or braking levels.

Figure 4:
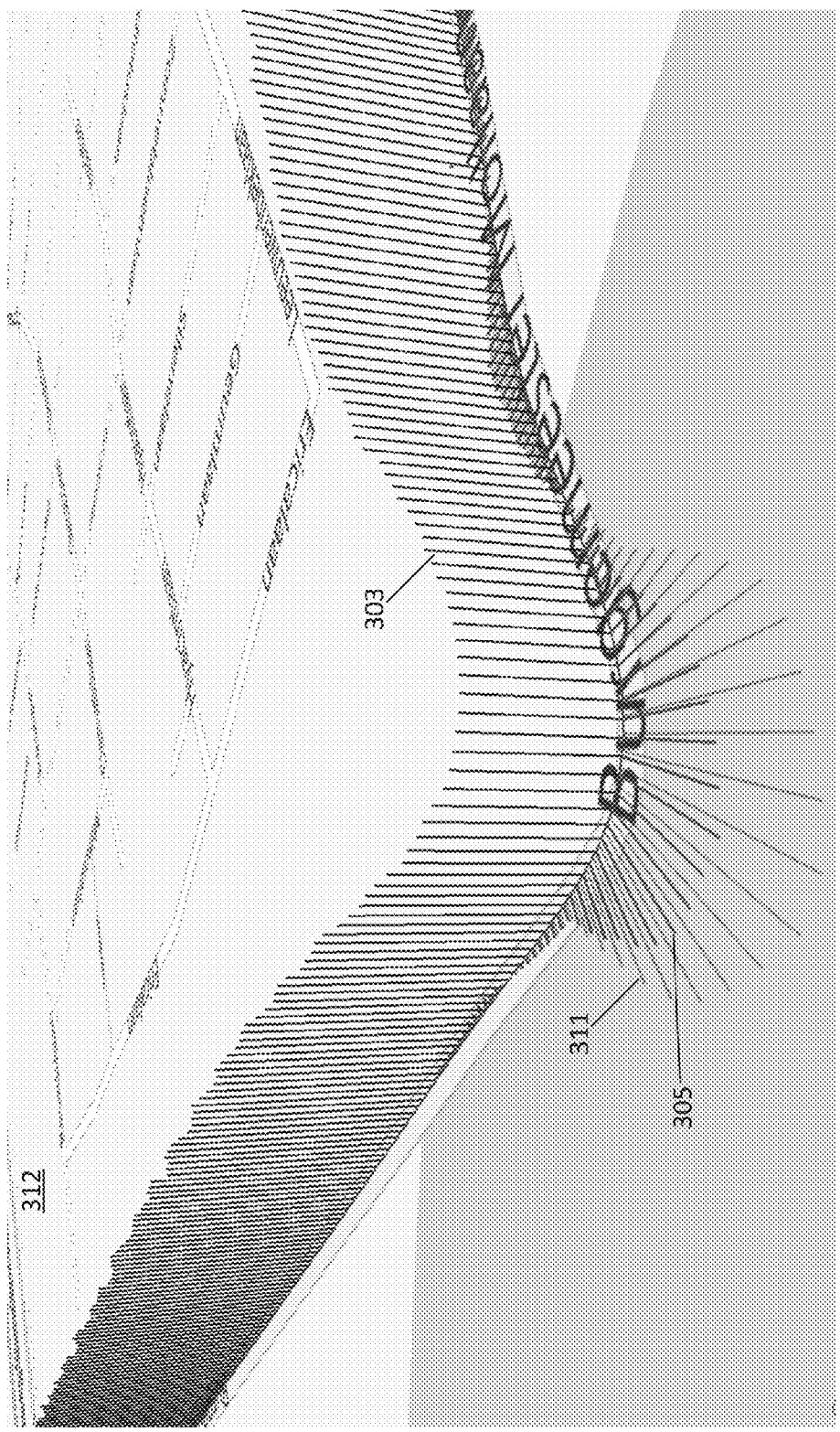
FIG. 4 illustrates an example data profile.

FIG. 4 illustrates an example data profile derived from probe data collected by probe vehicles. The data profile or probe data is superimposed on a map 312 in order to illustrate where the data is collected and to facilitate comparison of the data. However, the data may be stored and manipulated in numerical form or vector form. The probe data is arranged in porcupines for the spline curve. A porcupine is a graphical illustration of a data point. The porcupine extends from the location of the collection of the data point in map 312 in a direction perpendicular to travel in a length proportional to the value of the data point. A first set of porcupines 311 illustrates the curvature of the road. A second set of porcupines 303 illustrates the speed profile of the road. FIG. 4 may illustrate the north bound probe data for the curve. A third set of porcupines 305 illustrates the lateral acceleration of probe vehicle traveling through the curve. The lateral acceleration may be calculated by the server 125 or the mobile device 122 from the speed profile and the curvature such that the lateral acceleration, which may be referred to as the centrifugal acceleration or centrifugal force placed on a driver by the movement of the vehicle, is the curvature time the square of the speed.

Figure 5:
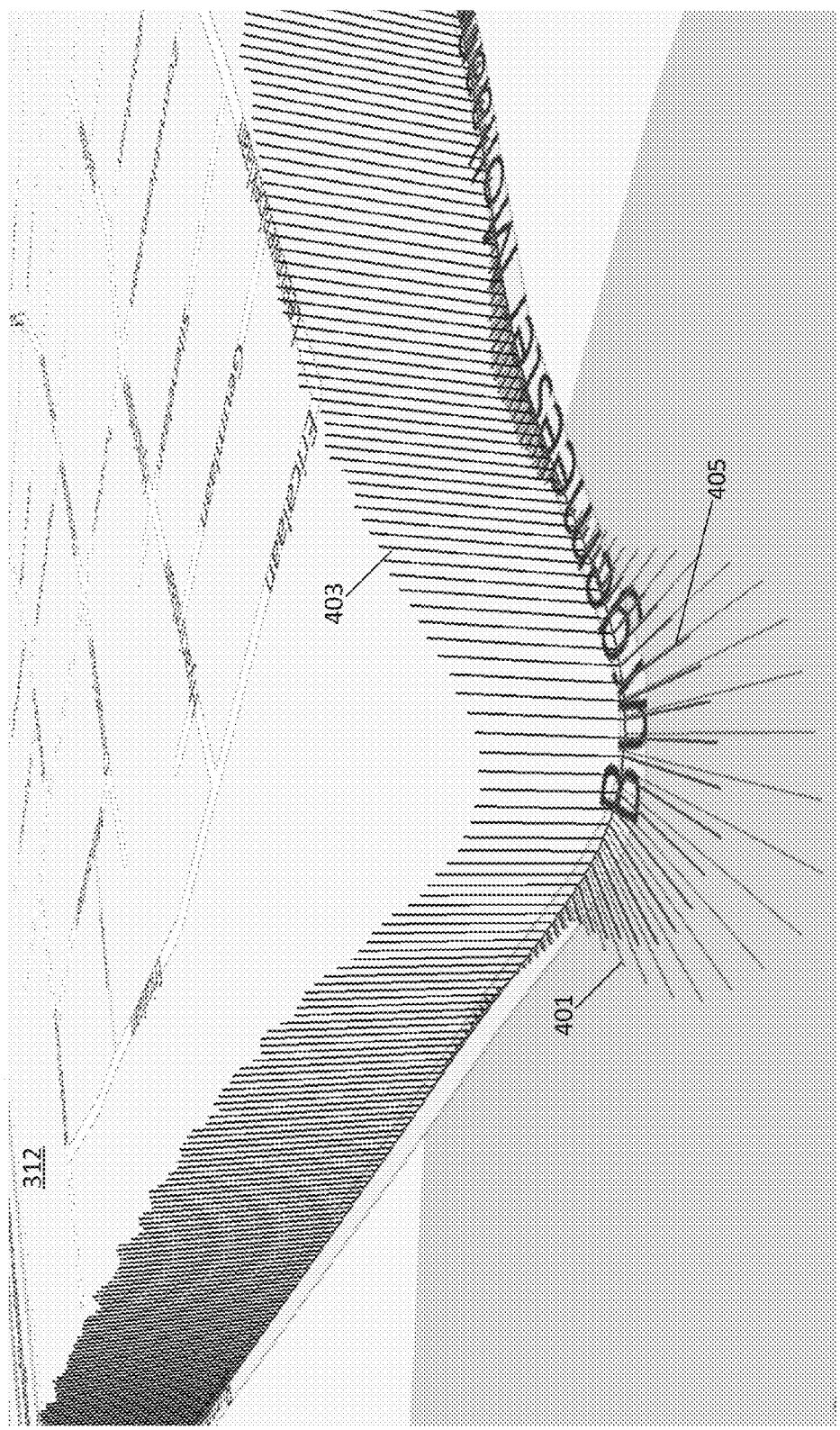
FIG. 5 illustrates the example data profile of FIG. 4 in another direction.

FIG. 5 illustrates the example data profile of FIG. 4 in another direction (e.g., in a southbound direction). A first set of porcupines 401 illustrates the curvature of the road in the southbound direction. The direction of the porcupines 401 may be on either side of the road segment, which illustrates the direction of the curve. A second set of porcupines 403 illustrates the speed profile of the road in the southbound direction. A third set of porcupines 405 illustrates the lateral acceleration of probe vehicle traveling through the curve. The porcupines in FIGS. 4 and 5 are optional graphical illustrations of the data stored in the polycurves.

Figure 6:
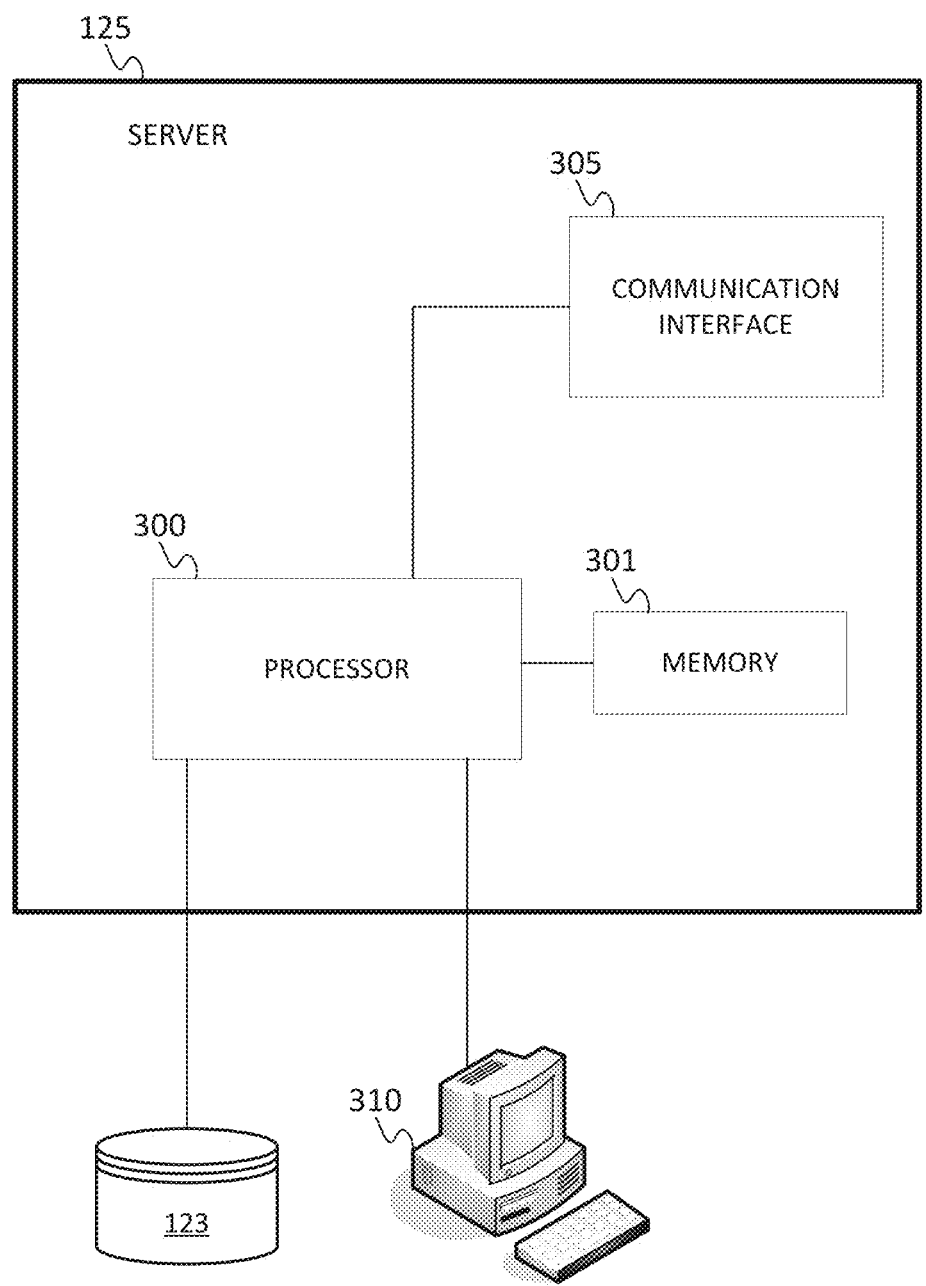
FIG. 6 illustrates an exemplary server of the system of FIG. 1.
Figure 7:
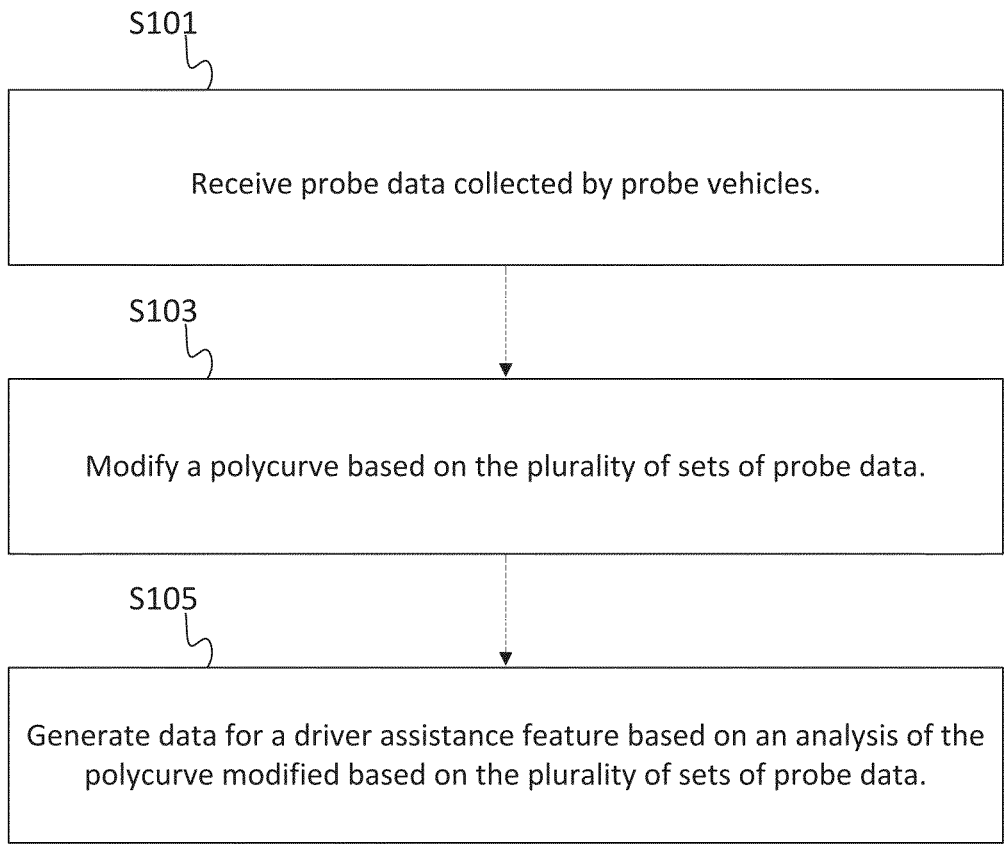
FIG. 7 illustrates an example flowchart for augmenting a data model with probe data.

FIG. 6 illustrates an exemplary server of the system of FIG. 1. The server 125 includes a processor 300, a communication interface 305, and a memory 301. The server 125 may be coupled to a database 123 and a workstation 310. The server 125 is configured to modify an ADAS model stored in database 123. The workstation 310 may be used as an input device for the server 125. In addition, the communication interface 305 is an input device for the server 125. The communication interface 305 receives data indicative of use inputs made via the workstation 128 or the mobile device 122. FIG. 7 illustrates a flowchart for augmenting a data model with probe data. The acts in FIG. 7 may be performed by the processor 300 or any combination of components of the mobile device 122 and the server 125. Additional, different, or fewer acts may be provided. The acts are performed in the order shown or other orders. The acts may also be repeated.

The memory 301 or database 123 is configured to store previously recorded probe data collected by probe vehicles. At act S101, the processor 300 or another component receives the probe data collected by the probe vehicles. The probe vehicles may be dispatched by a map developer. Alternatively, the probe vehicles may be crowd sourced through data collected by OBD systems or by mobile devices with a mobile application for collecting the probe data. In one example, the probe data may include position data only. In another example, the probe data may include velocity data and/or acceleration data associated with the geographic coordinates at which the data was collected.

The probe data may be classified according to vehicle type, weather, or time. The classification based on time may be as specific such as the time of day or broader such as the day of the week or the season of the year. The classification based on time may distinguish between night driving and daylight driving.

The classification based on vehicle type may specify whether the vehicle is a motorcycle, a sedan, a sports car, a small truck, or a large truck. The classification of the vehicle may be based on passenger room, cargo room, or gross weight. Example thresholds to classify vehicles by passenger room include 85 cubic feet or less (minicompact vehicle), 85 cubic feet to 100 cubic feet (subcompact vehicle), 100 cubic feet to 110 cubic feet (compact vehicle), 110 cubic feet to 120 cubic feet (midsize vehicle), and 120 cubic feet or more (full size vehicle). Examples threshold to classify vehicles by gross weight include under 4500 pounds (small truck), 4500 pounds to 8500 pounds (standard truck), and more than 8500 pounds (large truck).

Alternatively or in addition, the classification of the vehicle may be based on stopping distances and/or times. The stopping distance and/or time may be a range of values tied to a type of car as a function of the speed of the car. Example threshold distances for an average vehicle may include 60 to 65 feet at 20 miles per hour, 250 to 240 feet at 55 miles per hour, and 300 to 450 feet at 70 miles per hour. Higher performance vehicles may have lower stopping distances and lower performance or older vehicles may have higher stopping distances.

The classification based on weather may be based on weather data. The processor 300, which may be any type of controller, is configured to access weather data from another device, database, or website. The weather data describes the weather at the time the probe data is collected. In one example, the weather data indicates weather the road is likely wet or dry. In another example, the weather indicates a degree of rain, snow, ice, storms, wind, and/or sunlight.

The probe data may be organized into any combination of the preceding classifications to form a series of data. At act S103, the processor 300 is configured to modify a polycurve based on the sets of probe data. For example, the processor 300 is configured to organize each of the series of data into one or more additional dimensions of a polycurve (e.g., a spline curve). The spline curve may be sent to an ADAS of a navigation system or another mobile device. The spline curve may include road characteristics such as curvature and banking and may be modified to include the speed, acceleration, or another measured value of the probe data. The spline curve may be a B-spline, Bezier curve, a clothoid or another type.

The series of data may be projected on onto an ADAS spline to allow spatial ordering of the data to associate probes with corresponding spline/road location. Spatial sorting along this line permits the calculation of average driving behavior at any point along the road and statistical parameters of driving behavior (e.g., variance, standard deviation, means, and medians or speed, velocity, acceleration, or a derivative of acceleration).

At act S105, the processor 300 is configured to generate a driving assistance feature based on the the polycurve modified based on the plurality of sets of probe data. In one example, the processor 300 is configured to provide the driving assistance feature by sending the modified polycurve to an ADAS system (e.g., mobile device 122). In another example, the processor 300 is configured to provide the driving assistance feature to the mobile device 122 based on an analysis of one or more additional dimensions of the spline curve. The analysis may be a statistical analysis that identifies the average driving behavior at any point along the road and statistical parameters of driving behavior (e.g., variance, standard deviation, means, and medians or speed, velocity, acceleration, or a derivative of acceleration). The statistical parameters of driving parameters may be stored separately in the additional dimensions of the spline curve.

Alternatively, the processor 300 may provide the driving assistance feature by generating the speed warning or the acceleration warning and sending the warning to the ADAS system. For example, the processor 300 may receive current speed or acceleration data associated with a road position from the mobile device 122. The processor 300 access the spline curve at the road position for a threshold level of speed or acceleration. The processor 300 compares the current speed or acceleration to the threshold level of speed or acceleration. When the current speed or acceleration exceeds the threshold, the processor 300 generates a warning. Alternatively, the processor 300 may generate a command to slow or brake the vehicle. The warning may be a data message sent to the mobile device 122 that an upcoming curve or other feature in the road is approaching at a faster than normal rate.

The threshold may have multiple levels. One level may be based on comfort of the average user, and another level may be based on safety. For example, the processor 300 may be configured to analyze the previously recorded probe data to generate a comfort threshold at a first number of standard deviations above an average of the previously recorded probe data and a safety threshold at a second number of standard deviations above the average of the previously recoded probe data.

The thresholds may be stored at only specific location along the path. For example, the processor 300 may be configured to analyze the previously recorded probe data to a first position where, on average, drivers of the plurality of probe vehicles begin to brake for a curve and a second position wherein, on average, drivers of the plurality of probe vehicles stop braking for the curve.

In analyzing the previously recorded probe data, the processor 300 may also distinguish between speeds of vehicles. The speeds of the vehicles may be organized in in a set of categories. One example would be 40 miles per hour and under, 40 miles per hour to 60 miles per hour, and over 60 miles per hour. Another example may be within a set percentage of the speed limit, more than the set percentage over the speed limit, and more than the set percentage. The set percentage may be 5 percent, 10 percent, or another value. The processor 300 is configured to calculate a first position where, on average, drivers of each speed category in the plurality of probe vehicles begin to brake for a curve and a second position wherein, on average, drivers in the speed category of the plurality of probe vehicles stop braking for the curve.

Figure 8:
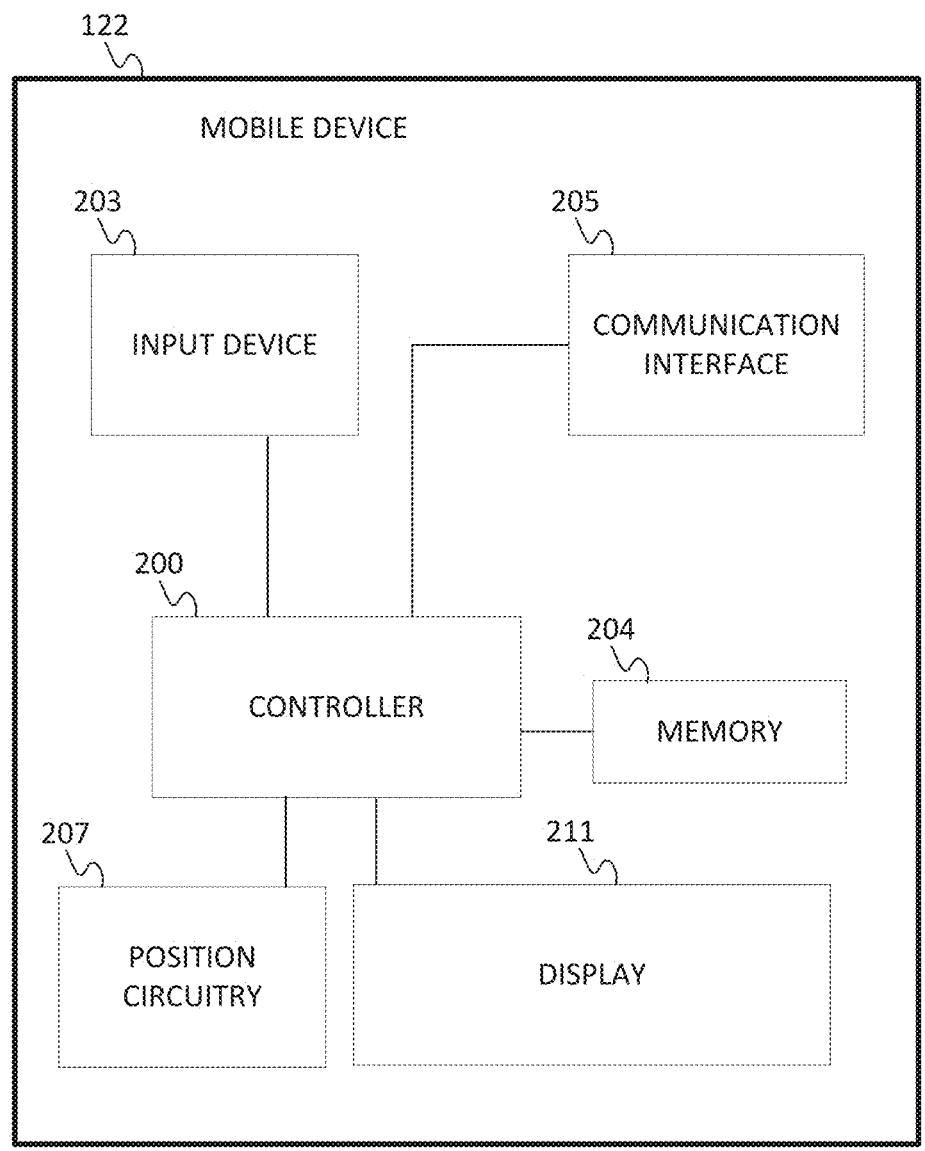
FIG. 8 illustrates an exemplary mobile device of the system of FIG. 1.
Figure 9:
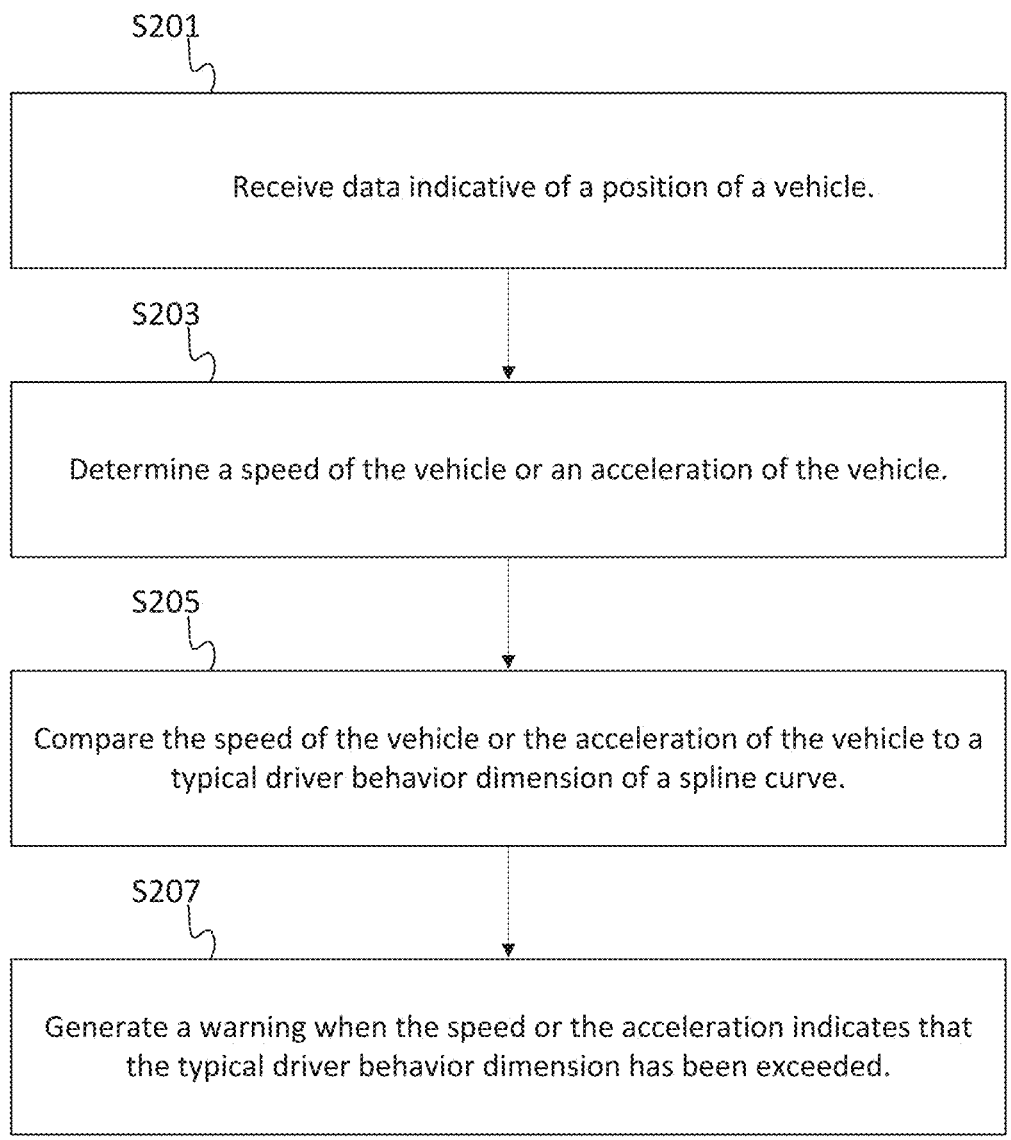
FIG. 9 illustrates an example flowchart for providing a safety function based on an augmented data model.

FIG. 8 illustrates an exemplary mobile device of the system of FIG. 1. The mobile device 122 may be referred to as a navigation device. The mobile device 122 includes a controller 200, a memory 204, an input device 203, a communication interface 205, position circuitry 207, and a display 211. The workstation 128 may include at least a memory and processor and may be substituted for the mobile device in the following endpoint-based embodiments. In the following endpoint-based embodiments, the mobile device 122 or the workstation 128 performs a majority of the processing. FIG. 9 illustrates an example flowchart for providing a safety function based on an augmented data model. The acts in FIG. 9 may be performed by the mobile device 122 or any combination of components of the mobile device 122. Additional, different, or fewer acts may be provided. The acts are performed in the order shown or other orders. The acts may also be repeated.

At act S201, the controller 200 receives data indicative of a position of a vehicle. The position data is received from position circuitry 207. At act S203, the controller 200 calculates a speed of the vehicle or an acceleration of the vehicle. In another example, the controller 200 considers multiple parameters selected from speed, deceleration, braking point, braking force, and lateral acceleration. The change in consecutive points in the position data may be used for the average speed of the vehicle, and the change in consecutive points in the average speed of the vehicle may be used for the average acceleration. The controller 200 may also be configured to determine a direction of travel of the vehicle. The direction of travel may be derived from a change in position of the vehicle (e.g., change in position of consecutive position coordinates of the vehicle) or from the location of the vehicle (e.g., location within a specific lane of a road).

At act S205, the controller 200 compares the speed of the vehicle or the acceleration of the vehicle to a typical driver behavior dimension of a data model, which may be a spline curve or a discrete data model. The spline curve may be accessed according to the current position of the vehicle and/or direction of the vehicle received in act S201. The discrete data model, which may be an ADAS model, is not analytical. Instead, individual values for behavior based data (e.g., position, heading, slope, lateral acceleration, speed, acceleration, or other metrics) are stored in a data table. The individual values in the data table may correspond to dimensions of a spline curve and/or derived from a spline curve.

At act S207, the controller 200 generates a warning when the speed or the acceleration indicates that the typical driver behavior dimension has been exceeded. The warning may include a message that is displayed on the display 211. Alternatively, the warning may appear on the dashboard of the vehicle or in a heads up display on the windshield. The warning may be a command sent to the vehicle. For example, the warning may be sent to the ADAS to automatically slow or brake the vehicle.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, Wi-Fi positioning, video surveillance, light detection and ranging (LiDAR), position by radio frequency identification (RFID), or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The database 123 of the system 120 may be a geographic database. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment) and may contain zero or more shape points to describe an approximate road shape in form of a polyline. The node at either end of a road segment may correspond to a location at which the road meets another road, i.e., an intersection, or where the road dead-ends. The road segment data may also include a continuous ADAS two dimensional and/or three dimensional curve representation of the road segment. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The mobile device 122 may provide navigation-related features such as a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region such that addresses or points of interest along the route may be selected to display street side imagery.

In one embodiment, the route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Non-transitory computer readable media may be encoded with instructions for performing any of the above acts or functions. While the non-transitory computer-readable medium may be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, by a processor, a plurality of sets of probe data collected by probe vehicles;
   determining a threshold level of speed or acceleration based on the plurality of sets of probe data, wherein the threshold level is a function of position;
   modifying a polycurve based on the plurality of sets of probe data, wherein the polycurve is a piecewise function of map data; and
   generating data for a driver assistance feature based on the polycurve modified based on the plurality of sets of probe data;
   wherein the driver assistance feature generates a warning if a current level of speed or acceleration exceeds the threshold level of speed or acceleration.

2. The method of claim 1, wherein the piecewise function is a series of polynomial functions defined by a plurality of knots and a plurality of control points.

3. The method of claim 1, wherein the plurality of sets of probe data are historical data describing speed, acceleration, deceleration, or braking patterns of the probe vehicles.

4. The method of claim 1, wherein the plurality of sets of probe data are collected by one or more position sensors.

5. The method of claim 1, wherein the plurality of sets of probe data are collected by at least one of an inertial sensor, a magnetometer, or an on-board diagnostic system.

6. The method of claim 1, wherein the piecewise function is derived from a spline model of geographic data.

7. The method of claim 1, further comprising:
sorting the plurality of sets of probe data according to traffic levels, weather condition, classifications of the probe vehicles, or time of day.

8. The method of claim 1, further comprising:
providing the data for the driver assistance feature according to a geographic position of a mobile device.

9. A method comprising:
receiving, by a processor, data indicative of a position of a vehicle;
comparing movement of the vehicle to data indicative of a typical driver behavior for speed or acceleration in one or more dimensions of a polycurve, wherein the typical driver behavior for speed or acceleration is defined by a plurality of probe vehicles; and
generating a driving assistance message when the movement of the vehicle exceeds the typical driver behavior for speed or acceleration in one or more dimensions of the polycurve.

10. The method of claim 9, wherein the driving assistance message is a warning to a driver to maintain a slower driving speed.

11. The method of claim 9, wherein the driving assistance message is a command to automatically slow down or brake the vehicle.

12. The method of claim 9, wherein the data indicative of the typical driver behavior includes a typical velocity associated with the position of the vehicle.

13. The method of claim 9, wherein the data indicative of the typical driver behavior includes a typical lateral acceleration associated with the position of the vehicle.

14. The method of claim 13, wherein the movement of the vehicle includes a current lateral acceleration of the vehicle calculated from a curvature of a path times the square of the speed of the vehicle.

15. The method of claim 14, wherein the dimension of the polycurve including the data indicative of the typical driver behavior is a first dimension of the polycurve, and the curvature of the path is stored in or derived from a second dimension of the polycurve.

16. An apparatus comprising:
a memory configured to store previously recorded probe data collected at a plurality of probe vehicles; and
a controller configured to modify a spline curve by adding an additional dimension of data to the spline curve based on the previously recorded probe data and determine a threshold level of speed or acceleration based on the spline curve,
wherein the additional dimension of data of the spline curve provides a driving assistance feature to a user when the threshold level of speed or acceleration is exceeded.

17. The apparatus of claim 16, wherein the controller is configured to analyze the previously recorded probe data to generate a driving threshold for a location where the previously recorded probe data was collected.

18. The apparatus of claim 17, wherein the driving threshold is based on an average of the previously recorded probe data and at least one standard deviation of the previously recorded probe data.

19. The apparatus of claim 16, wherein the controller is configured to analyze the previously recorded probe data to generate a comfort threshold at a first number of standard deviations from an average of the previously recorded probe data and a safety threshold at a second number of standard deviations from the average of the previously recorded probe data.

20. The apparatus of claim 16, wherein the controller is configured to analyze the previously recorded probe data to a first position where, on average, drivers of the plurality of probe vehicles begin to brake for a curve and a second position where, on average, drivers of the plurality of probe vehicles stop braking for the curve.

21. An apparatus comprising:
at least one processor; and
at least one memory including computer program code for one or more programs, the at least one memory and the computer program code configured to, with the at least one processor, cause the apparatus to perform at least the following:
receiving data indicative of a position of a vehicle;
determining a speed of the vehicle or an acceleration of the vehicle;
comparing the speed of the vehicle or the acceleration of the vehicle to a threshold for speed or acceleration of typical driver behavior dimension of a data model, wherein the threshold is based on a plurality of sets of probe data; and
generating a warning when the speed or the acceleration indicates that the speed of the vehicle or the acceleration of the vehicle exceeds the threshold for speed or acceleration of typical driver behavior dimension has been exceeded.

22. The apparatus of claim 21, wherein the acceleration of the vehicle is a current lateral acceleration of the vehicle calculated based on a speed of the vehicle and a current curvature of a path of travel of the vehicle.

23. The apparatus of claim 21, wherein the typical driver behavior dimension is a comfort level or a safety level.

24. The apparatus of claim 21, wherein the probe data is for a plurality of probe vehicles.

25. The apparatus of claim 24, wherein the probe data describes historical speed, acceleration, deceleration, or braking patterns of the plurality of probe vehicles.

26. The apparatus of claim 21, wherein the threshold for speed or acceleration is included in an advanced driver assistance system spline curve.

* * * * *